(12) United States Patent  
Suzuki

(10) Patent No.: US 7,686,372 B2  
(45) Date of Patent: Mar. 30, 2010

(54) SPOT SUN VISOR

(76) Inventor: Toshimi Suzuki, 2665-1 Murakami, Yachiyo-shi, Chiba (JP) 276-0028

( * ) Notice: Subject to any disclaimer, the term of this patent is extended or adjusted under 35 U.S.C. 154(b) by 0 days.

(21) Appl. No.: 12/256,681

(22) Filed: Oct. 23, 2008

(65) Prior Publication Data

US 2009/0302634 A1    Dec. 10, 2009

(30) Foreign Application Priority Data

Jun. 10, 2008  (JP) .............................. 2008-177362

(51) Int. Cl.
B60J 3/02       (2006.01)
(52) U.S. Cl. .................................................. 296/97.4
(58) Field of Classification Search ................ 296/97.1, 296/97.4, 97.2, 97.11
See application file for complete search history.

(56) References Cited

U.S. PATENT DOCUMENTS

| H1834 H | * | 2/2000 | Wilson et al. ............. 296/97.11 |
| 7,461,887 B1 | * | 12/2008 | Federle et al. ............. 296/97.4 |
| 2009/0079221 A1 | * | 3/2009 | Marshall ..................... 296/97.4 |

* cited by examiner

Primary Examiner—Joseph D Pape
(74) Attorney, Agent, or Firm—Bacon & Thomas, PLLC

(57) ABSTRACT

A spot sun visor for use in transportation vehicles having a body of a little larger area than the disk of the sun. By moving the body in the direction of the penetrating sunlight and place the body directly in front of the position of the sun, the sunlight from the front view can be blocked or effectively reduced without undue interference of the field of the front view. The body has at least one arm to support and move the body and an axle of the arm is equipped with a slide device stored in a unit case, which stores the body during non-use. The arm pulls out the body along the front glass and is controlled by a brake device installed at the end of the arm. An electric control and drive system may be used to manually or automatically position the spot sun visor.

10 Claims, 4 Drawing Sheets

SPOT SUN VISOR

FIELD OF THE INVENTION

The present invention relates to a spot sun visor to be equipped in a cockpit of traffic vehicles such as, for example, automobiles for blocking or minimizing the effect of direct sunlight penetrating into the cockpit. By utilizing a visor having an area that is slightly larger than the disk of the sun as seen from the cockpit and by moving the visor to a location corresponding to the direction of the penetrating sunlight and positioning the visor directly in front of the sun, only the sunlight from the front view is blocked or minimized, while the entire field of vision from the cockpit is only slightly reduced, or not reduced.

BACKGROUND

Conventional automobiles are equipped with a rectangular sun visor to completely block the direct sunlight penetrating through the front glass. It is usually pushed up to the head lining of the driver's seat while not in use during the driving, and pulled down when shading is necessary.

However, this type of sun visor has a rather large-area rectangular shading plate to block the penetrating sunlight originating from different directions. Therefore, depending on the angle that the shading plate is pulled down, the upper half of the field of view required for driving may be slightly or wholly interfered with. In such a case, especially when driving along city streets, it is difficult to see traffic signals and road signs etc., which are required for driving safely.

However, the beam of sunlight penetrating into the cockpit is only a small spot of the vast sky. The spot sun visor of the present disclosure blocks or affects just that spot and thus protects the driver from intensive sunlight, without undue interference in the field of view in order to achieve safer driving.

In addition to use in automobiles and trains, the present innovation can be applied to cockpits for ships navigating the vast sea and airplanes flying across the sky.

As the ships and airplanes mentioned above are usually moving for a long period on predefined route, as often as not they make progress toward the sun or they may encounter a sudden weather change or an obstacle coming from unexpected direction. For such predicaments, they always need a constant surveillance and a wide view, and the spot sun visor of the present disclosure is intended for effective use with these transportations in order to contribute traffic safety.

SUMMARY

The present invention provides a spot sun visor comprising a body arranged for blocking off or reducing the effect of direct sunlight and at least one arm to support the body. The body is set generally in parallel to a cross section of the front glass of a cockpit of a vehicle. The supporting arm includes an axle located at a first end that is vertical to the cross section of the front glass. The body of the spot sun visor is mounted via a turntable having an axle to a second end of the supporting arm opposed to the first end. The body of the spot sun visor can be moved parallel to the front glass via rotation of the supporting arm about its axle.

Further, the body of the spot sun visor can be rotated about the second end of the supporting arm via its axle. The turntable also includes a tilt. The body is mounted on the turntable and its angle of tilt can be adjusted and maintained via the use of function within the tilt mechanism.

Moreover, the abovementioned spot sun visor is stored in a unit case above the driver's seat when not in use. The axle of the supporting arm cooperates with a slide device set in a base plate inside of the case in order to move along the surface of the front glass in parallel with the cross section of the front glass from a stored position to a use position. Frictional resistance of a brake device is assembled into the axle of the supporting arm in order to provide stable control and positioning of the supporting arm and the body of the spot sun visor.

By this structure, the slide device for pulling out the supporting arm along the front glass and placing the supporting arm back in the unit case, and the swing device of the supporting arm that provides movement from side to side are each controlled with the brake device assembled into the axle of the arm. Accordingly, a series of operations of quick moving and positioning of the spot sun visor can be accomplished via one-touch-and-release control from the driver's seat, and thus a spot sun visor capable of adjusting to direct sunlight coming from different directions can be obtained.

As a further feature, the surface of the supporting arm is bent at a slight angle from the substantially planar surface which is oriented at a right angle to the axis of the axle of the supporting arm so that the arm can be moved in parallel to a front glass having a curved surface. The angle may be adjusted to keep the supporting arm parallel to the curve of the front glass.

In an alternate configuration, by providing an electric motor drive system such as an electric drive device attached to the above-mentioned spot sun visor, controlled by electrical signals activated from the driver's seat, an electric-motor-drive spot sun visor can be achieved.

Also, by installing a sunbeam sensor in the cockpit and connecting it to electrical circuits, an automatic control system, which senses the direction of the penetrating sunlight and moves the spot sun visor accordingly, is provided.

As mentioned above, the spot sun visor of the present disclosure generally includes at least one arm as mentioned above and a body mounted on the arm. The sun spot visor of the present disclosure can be moved by a slide device installed in a unit case, and the movement and positioning of an axle of the supporting arm is stably controlled by a brake device mounted on the axle of the arm.

DETAILED DESCRIPTION OF VARIOUS EMBODIMENTS

A first embodiment according to the present disclosure is explained as follows based upon the drawings of FIGS. 1-3.

Figure 1:
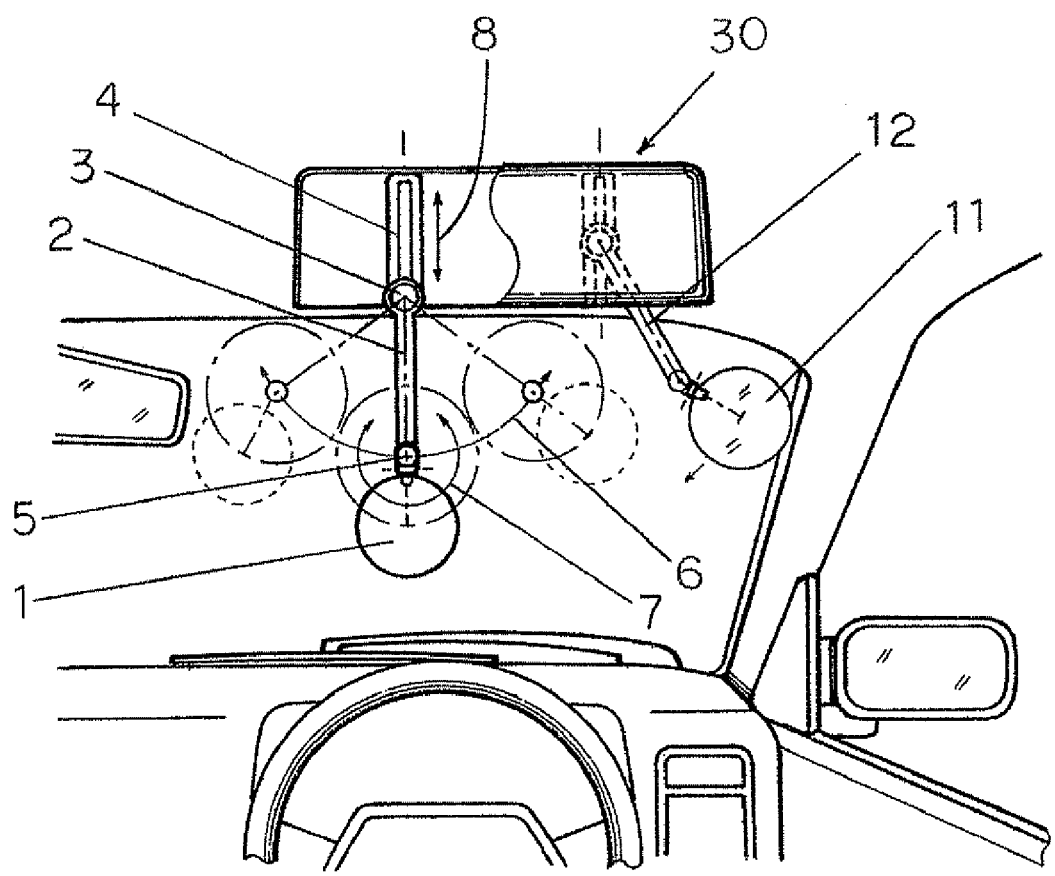
FIG. 1 is a plan view of a first embodiment according to the present disclosure.

FIG. 1 shows an embodiment of a spot sun visor installed in an ordinary car and further showing a series of operations of moving the body 1 to block or reduce the effect of the direct sunlight in the direction of the penetrating sunlight by placing the body at a position directly in front of the position of the sun.

Figure 2:
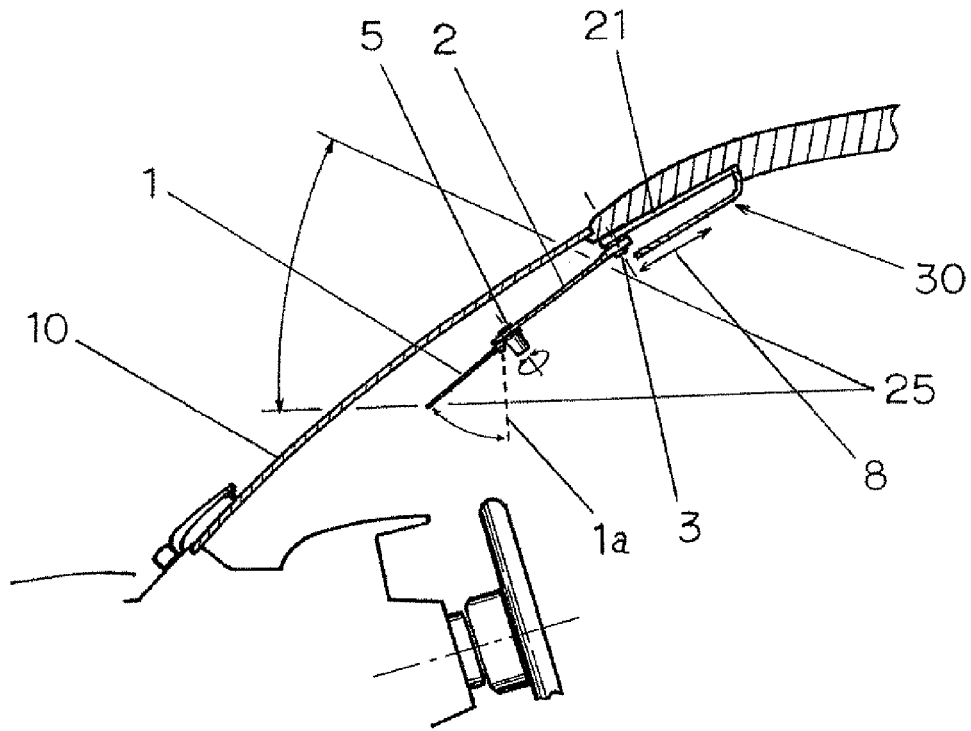
FIG. 2 is a partial cross-sectional side view of the embodiment according to FIG. 1.
Figure 3:
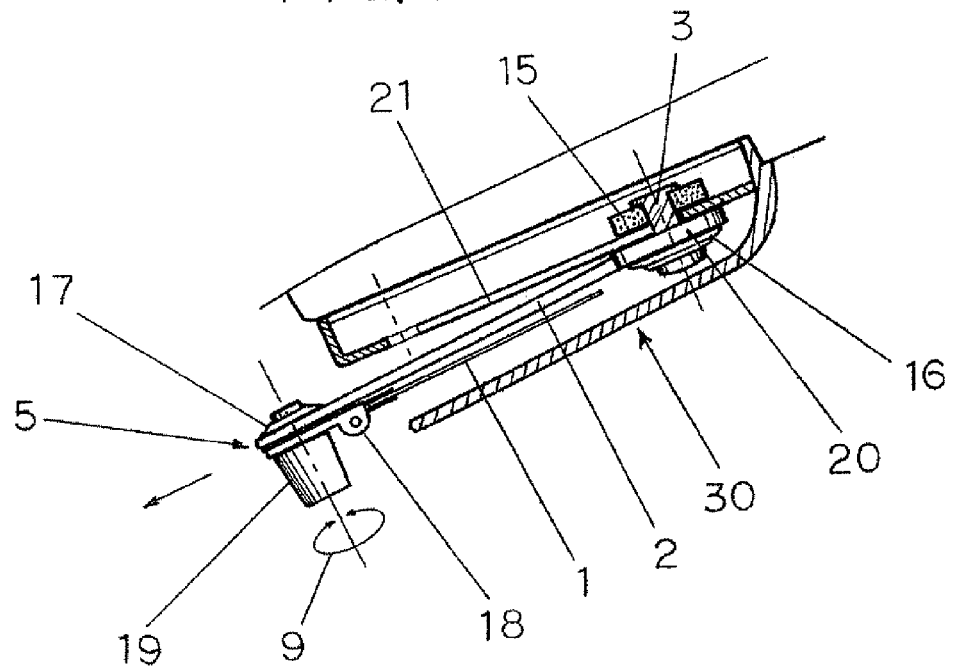
FIG. 3 is an enlarged partial sectional view of the unit case of the embodiment according to FIG. 1.

As shown in FIGS. 1-3, the spot sun visor is structured so that the body 1 to block or reduce the effect of direct sunlight is equipped with a turntable 5 attached at a second end of a supporting arm 2. A supporting axle 3 of the supporting arm 2 is assembled in a unit case 30 over the head lining in the driver's seat. The axle 3 can be moved along the surface of the front glass by a slide device 4 which is installed in a base plate 21 in the case.

Accordingly, the spot sun visor of the present invention is movable in the direction of the arrow 8 with the axle 3 as the pivot of the supporting arm 2. A sliding action to pull down the body 1 along the front glass and to thrust the body 1 back to the original, non-use position, and a swinging action (in the direction of arrow 6) to move the supporting arm 2 right and left can be controllable by a brake device of the axle 3 so that the body 1 can be fixable at arbitrary positions, depending upon the direction of the direct sunlight or the position of the sun.

Also, the body 1 can be moved in arbitrary directions (arrow 7) by use of a tilt mechanism 18 at the turntable 5 and, by making use of its braking action, the body 1 can be fixed at a position directly in front of the position of the sun. Furthermore, by installing an additional arm 12 in this embodiment, which functions in a similar manner to supporting arm 2, and adding a mirror 11 on one side of a body positioned at the end of the arm 12, it is possible to view approaching following cars that appear in a blind angle of the door mirror or when a change of driving lane is necessary. Besides, at the same time, it is possible to use the body and mirror 11 to block off the sunlight around the front pillar.

As shown in FIG. 2, the spot sun visor of the present disclosure is movable in the direction of arrow 8 by the slide device 4 installed in the unit case 30, where the cross section of the supporting arm 2 installed in the unit case 30 and the cross section of the body 1 are almost in parallel with the cross section of the front glass 10 and are movable along each other.

Also, the body 1 can be tilted forward (dotted line 1a) by the tilt mechanism of the turntable 5 attached to the end of the arm 2 and the tilting angle of the body can be adjustable. Thus, spot cutting of the sunlight on the skyline (rising and setting sun), which was impossible for a conventional sun visor, becomes possible and consequently protects a driver's eyes from the penetrating direct sunlight from the front view at the visual point 25 of the drivers seat.

As shown in FIG. 3, the spot sun visor of the present disclosure is stored during non-use within the unit case 30, where the body 1 to block or reduce the effect of the direct sunlight is rotated at 180 degrees and stored in the case.

Also, at the spot attached to the axle 3, the supporting arm 2 is provided with a pedestal 20, where an adequate mechanical strength and stable smooth sliding are also provided for the contact surface exposed to the base plate 21 of the case, and the arm is bent slightly at an angle to the horizontal surface which is at a right angle to the axis of the axle 3 and is further assembled on the base plate 21 with the brake device mounted at the axle partially in cross section).

The brake device is integrated in an assembly of a permanent magnet 15 to pinch the base plate 21 at an inner side thereof, and the arm 2 and a spring 16 of elastic material at an outer side thereof. The brake device functions via the friction arising on the base plate 21 from the attraction of the magnet 15 and the compressive force of the spring in order to provide stable control of the movement and positioning of the arm 2.

Also, the body 1 is mounted to the tilt mechanism 18 on the turn table 5 mounted at the end of the arm, and can be rotated in 360 degrees by use of the rotation knob 19, as shown by an arrow 9, and the angle of the rotation can be adjustably positioned by use of a spring 17 inserted at the axle of the knob 19. Further, the tilt angle between the body 1 and the arm 2 can be adjustably positioned by utilizing a friction provided in the tilt mechanism 18.

Figure 4:
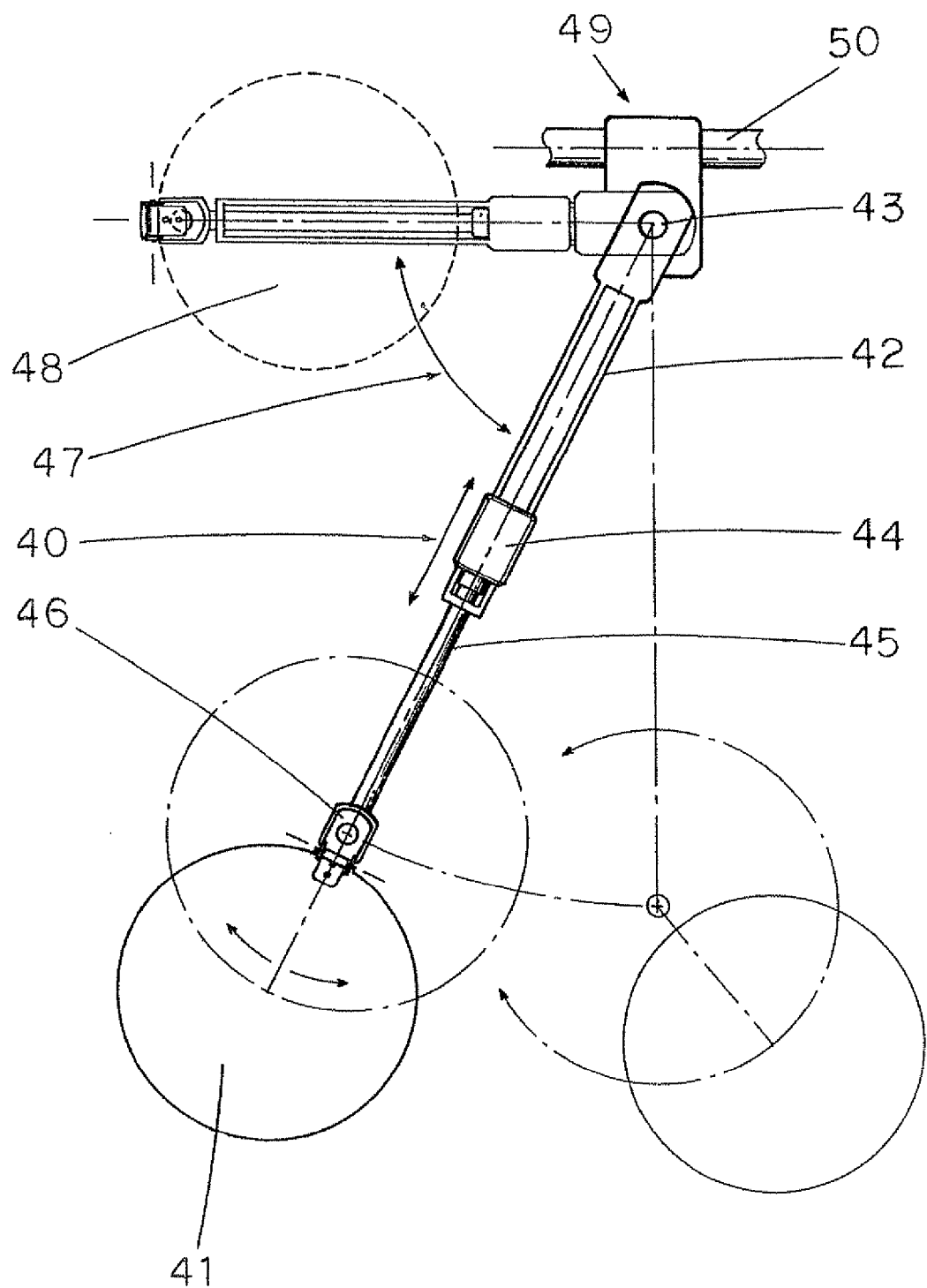
FIG. 4 is a plan view showing another embodiment according to the present disclosure.

An example of an embodiment of the spot sun visor applied to trains, ships and airplanes having a wider space of front glass is shown in FIG. 4.

The length of a supporting arm 42 of the spot sun visor can be adjusted to be larger or smaller by pulling the built-in telescoping rod 45 out of, or pushing the rod 45 into, the arm 42 in the direction of the arrow 40. Further, by swinging the arm 42 left and right at the axle 43 of the arm 42 as the pivot, and by moving the arm 42 in the direction of penetrating sunlight, the spot sun visor can cover a wider area of a front glass.

A body 41 for blocking or reducing the effect of the direct sunlight is mounted on a turn table 46 at an end of the rod 45 opposed to the end of the arm 42 having the axle 43. The body 41 rotates left and right at an axis of an axle of the turn table and can be fixed in position just in front of the positioning of the sun by a brake device installed in the axle of the turn table 46. Furthermore, when the spot sun visor is not in use, the rod 45 is inserted into the arm 42 to shorten its length. The collapsed arm 42 and rod 45 are rotated in the direction indicated by arrow 47, and then the body 41 is rotated up to the position shown by the dotted line 48 and retained there.

Also, the arm 42 is mounted on a sustainer 49, which is equipped in the cockpit and freely movable along a rail 50 so that it can cover a broad area of the front glass.

The following is the explanation of exemplary materials for use in the above-mentioned-embodiment.

The body 1 for blocking or reducing the effect of the direct sunlight is made mainly from an opaque material using a light metal such as aluminum or titanium alloys, or from a semi-opaque material, which is applied as a fine prism processing, surface coating, or coloring etc. to synthetic resins like acryl or polyester resins. In cases, the body can be processed in the form of a plate.

A distinctive feature of the present disclosure is that, by combining polarization glass, filters, sun glass or other materials with a synthetic resin, the direct sun light penetrating into the cockpit can be converted to a favorable color tone by polarization or modulation. Thus, a driver is protected from intensive sunlight and is able to see front views in a tender light.

Also, the body 1 mentioned above can be formed in a generally oval, circular, or polygonal shape. The body 1 has a feature that, by mounting its end in the tilt mechanism of the turn table, the body can be turned or tilted at that mounting point as the pivot.

Figure 5:
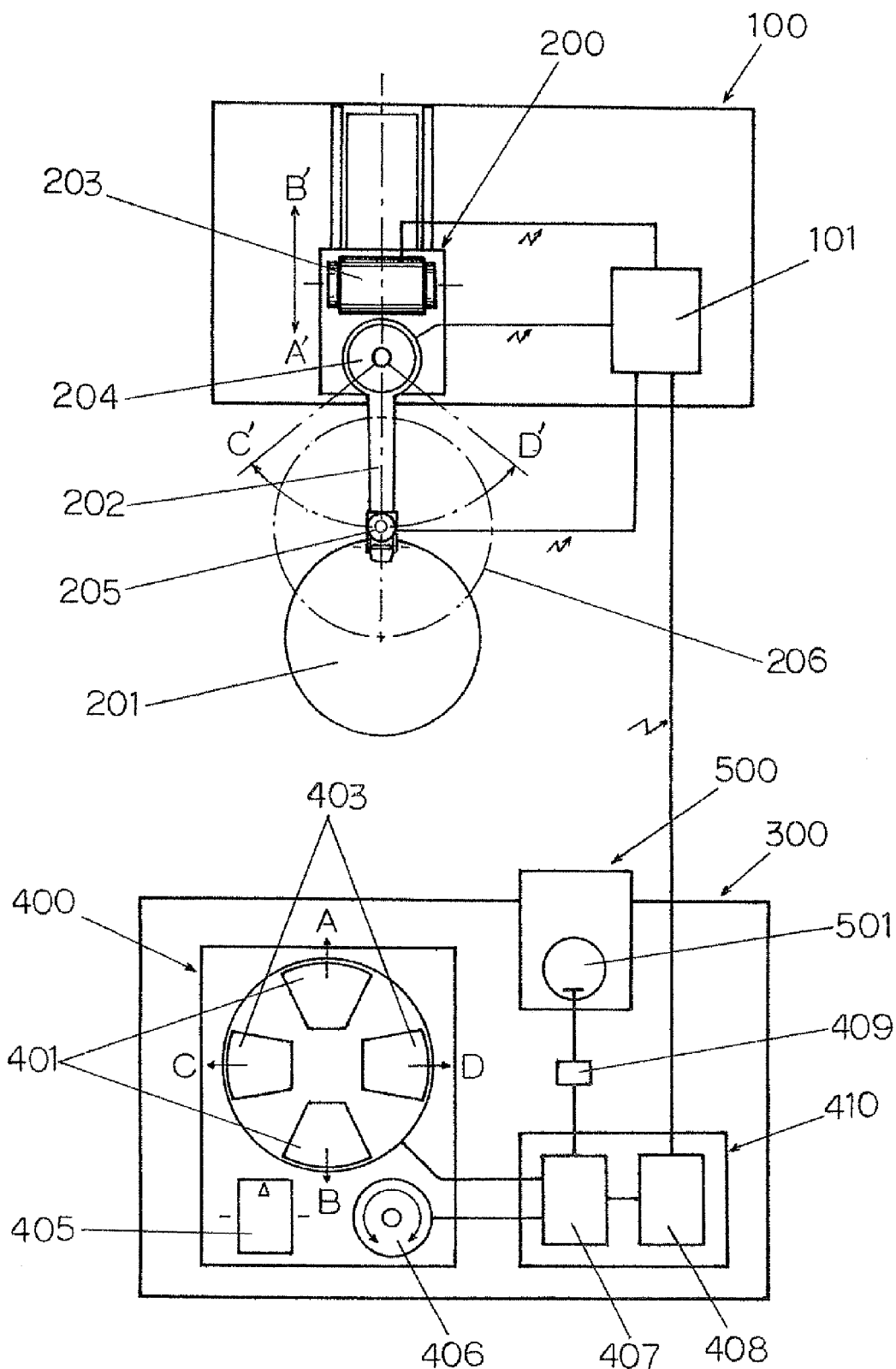
FIG. 5 is a plan view showing an embodiment of an electric motor drive system of the spot sun visor according to the present disclosure.

Also, as to the arm 2 for supporting the above-mentioned body (As shown in FIGS. 3 to 5), exemplary materials include processed stainless steel, beryllium bronze plate, or the like, which has prominent anti-corrosion and abrasion resistance and moderate elasticity. Further, by forming a pedestal at the part where the arm is fixed to the axle, the operation of the arm can be controlled smoothly as friction or contact between the parts are reduced and the stable movement of the axle is ensured.

Also, the arm 42 shown in FIG. 4 has an integrated structure consisting of a stainless steel pipe of an adequate length, the rod 45 of nearly equal length inserted within, and the control lever 44 attached at the end of the rod 45, therefore the length of the arm is structurally adjustable.

FIG. 5 shows an example of an embodiment of an electric motor drive system in which an electric drive device is mounted on the spot sun visor of the present disclosure and controls the position of the spot sun visor by electrical signals activated from the driver's seat.

As shown in FIG. 5, the electric drive device 200 installed in the unit case 100 has an electric drive motor 203 to pull the spot sun visor of the present disclosure out along the front glass and to push the spot sun visor back to the original position. The electric drive 200 also includes a stepping motor 204 to move the supporting arm 202 from right to left, and these are connected by an electrical circuit to a signal control device 101.

Also, the body 201 for blocking or reducing the effect of the direct sunlight is mounted on another stepping motor 205 at the end of the arm 202 which rotates from right to left (along a dot-dash line 206) by an electrical signal and can be stopped at an arbitrary position.

Also, an operation panel 300 installed at the driver's seat is provided with a cross key pad 400 to control the above-mentioned electric drive device 200 and an electronic device 410 to convert physical inputs to an electrical signal. These are connected via an electrical circuit.

As further shown in FIG. 5, on the cross key pad 400, the keys 401 arranged in the A-B direction cause the above-mentioned driving motor 203 to move along the A'-B' directions indicated by an arrow and the keys 403 arranged in the C-D direction cause the above-mentioned arm 202 to move along the C'-D' directions indicated by an arrow.

The body 201 for blocking or reducing the effect of the direct sunlight is controlled by a signal from a turn key 406 on the operation panel, where the stepping motor 205 mounted on the end of the arm rotates up to the same direction and the same angle as the turn key 406 and stops at the same position when the turn key stops.

Moreover, in the electronic device 410 on the above-mentioned operation panel, a mixer 407 to separate plural numbers of key input information and a pulse converter 408 to convert signals from the mixer to pulse signals are built-in, and they compose the electric motor drive system for sending the pulse signals to the signal control device 101 in the unit case.

Furthermore, in the electric motor drive system, by installing an azimuth sensor 501 to detect the sunlight through the front glass 500 and an electronic device 409 to convert the information therefrom to electrical signals and then connecting them to the mixer 407, the automatic electric motor drive system to control the spot sun visor of the present disclosure can be controlled for automatic positioning of the body 210 directly in front of the position of the sun.

INDUSTRIAL APPLICABILITY

As mentioned above, by installing the spot sun visor of the present disclosure into the cockpit of traffic vehicles such as automobiles, trains, ships, air planes, etc., only the direct sunlight can be blocked or reduced, without undue interference of the front field of view. In view of the function of moving the spot sun visor freely along the front glass and fixing just in front of the position of the sun, the spot sun visor can be adjusted to accommodate the sunlight coming from different directions, and thus protects drivers' eyes from intensive sunlight as a result. Accordingly, the spot sun visor of the present disclosure will contribute immensely to traffic safety, and therefore has industrial applicability.

What is claimed is:

1. A spot sun visor arranged to be installed in a cockpit of transportation vehicles, the spot sun visor comprising:
   a supporting arm connected at a first end to an axle slidably connected to a base plate arranged to be connected to a portion of a cockpit of a transportation vehicle;
   a body rotatably connected to a second end of the supporting arm; and
   at least one drive mechanism;
   wherein the body is configured to be selectively adjustably positionable via the at least one drive mechanism to move and maintain the body from a non-use position to a use position directly in front of a position of the sun to block or reduce the effect of direct sunlight; and
   wherein the at least one drive mechanism comprises:
   a first electric motor arranged to slidably move the supporting arm;
   a first stepping motor arranged to rotate the supporting arm; and
   a second stepping motor arranged to rotate the body.

2. The spot sun visor according to claim 1, wherein each of the first electric motor and the first and second stepping motors activate in response to manual inputs converted into electrical signals.

3. The spot sun visor according to claim 1, further comprising:
   an azimuth sensor; wherein each of the first electric motor and the first and second stepping motors activate in response to signals from the azimuth sensor.

4. The spot sun visor according to claim 1 further comprising:
   a turn table having an axle, the turn table mounted between the body and the second end of the supporting arm; and
   a tilt mechanism positioned between the body and the turn table.

5. The spot sun visor according to claim 4, wherein the second stepping motor is arranged to rotate the body via the turn table and the tilt mechanism.

6. The spot sun visor according to claim 1, further comprising:
   a unit case;
   wherein the first electric motor is installed within the unit case.

7. The spot sun visor according to claim 1, further comprising:
   a signal control device connected by an electrical circuit to the at least one drive mechanism.

8. The spot sun visor according to claim 7, further comprising:
   an operation panel having a cross key pad for controlling the least one drive mechanism; and
   an electronic device to convert physical inputs to an electrical signal;
   wherein the operation panel is connected by an electrical circuit to the at least one drive mechanism.

9. The spot sun visor according to claim 8, wherein the operation panel further includes a turn key for providing control signals to the second stepping motor.

10. The spot sun visor according to claim 8, further comprising:
    a mixer to separate plural numbers of key input information; and
    a converter to convert signals from the mixer to pulse signals.

* * * * *